US009025570B2

(12) United States Patent
Terry et al.

(10) Patent No.: US 9,025,570 B2
(45) Date of Patent: *May 5, 2015

(54) SYSTEM AND METHOD FOR FAST DYNAMIC LINK ADAPTATION

(71) Applicant: Rakuten, Inc., Tokyo (JP)

(72) Inventors: Stephen E. Terry, Northport, NY (US); Robert A. DiFazio, Greenlawn, NY (US); Stephen G. Dick, Nesconset, NY (US); Joseph S. Levy, Merrick, NY (US)

(73) Assignee: Rakuten, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/220,712

(22) Filed: Mar. 20, 2014

(65) Prior Publication Data
US 2014/0204914 A1    Jul. 24, 2014

Related U.S. Application Data

(66) Continuation of application No. 13/035,125, filed on Feb. 25, 2011, now Pat. No. 8,718,023, which is a continuation of application No. 11/959,578, filed on Dec. 19, 2007, now Pat. No. 7,903,616, which is a
(Continued)

(51) Int. Cl.
*H04B 7/216* (2006.01)
*H04W 52/30* (2009.01)
(Continued)

(52) U.S. Cl.
CPC ............ *H04W 52/30* (2013.01); *H04W 52/223* (2013.01); *H04W 52/262* (2013.01); *H04W 52/367* (2013.01); *H04W 52/50* (2013.01); *Y02B 60/50* (2013.01)

(58) Field of Classification Search
USPC .......... 370/252, 310, 335, 342, 336, 441, 466
See application file for complete search history.

(56) References Cited

U.S. PATENT DOCUMENTS 6,212,399 B1    4/2001    Kumar et al.
6,341,125 B1    1/2002    Hong et al.
(Continued)

FOREIGN PATENT DOCUMENTS

CA    2352696    1/2002
EP    0 853 393    7/1998
(Continued)

OTHER PUBLICATIONS

3GPP TS 25.133, "Technical Specification Group Radio Access Networks; Requirements for Support of Radio Resource Management (FDD)", 3rd Generation Partnership Project, v3.7.0, Release 1999, Sep. 2001, pp. 1-129.
(Continued)

*Primary Examiner* — Phuc Tran
(74) *Attorney, Agent, or Firm* — Hubbs, Enatsky & Inoue PLLC

(57) ABSTRACT

A method and user equipment for selecting a transport format combination (TFC) is disclosed. Configuration of a plurality of TFCs to use for TFC selection is received, wherein the TFCs of the plurality of TFCs have an order. TFCs to block from TFC selection from the plurality of TFCs is determined, wherein the TFCs to block are based at least on a maximum allowed transmit power. A TFC for transmission of uplink data is selected, wherein the selected TFC is based on the TFC order and wherein the selected TFC is a TFC that is not blocked from TFC selection.

14 Claims, 4 Drawing Sheets

Related U.S. Application Data continuation of application No. 11/503,822, filed on Aug. 14, 2006, now Pat. No. 7,313,117, which is a continuation of application No. 11/007,955, filed on Dec. 9, 2004, now Pat. No. 7,092,371, which is a continuation of application No. 10/273,302, filed on Oct. 17, 2002, now Pat. No. 6,845,088, Substitute for application No. 60/344,693, filed on Oct. 19, 2001.

(51) Int. Cl.
| | |
|---|---|
| H04W 52/22 | (2009.01) |
| H04W 52/26 | (2009.01) |
| H04W 52/36 | (2009.01) |
| H04W 52/50 | (2009.01) |

(56) References Cited

U.S. PATENT DOCUMENTS

| | | | |
|---|---|---|---|
| 6,434,375 | B1 | 8/2002 | Chulajata et al. |
| 6,483,838 | B1 | 11/2002 | Ostman et al. |
| 6,490,461 | B1 | 12/2002 | Müller |
| 6,510,137 | B1 | 1/2003 | Belaiche |
| 6,564,067 | B1 | 5/2003 | Agin |
| 6,572,662 | B2 | 6/2003 | Manohar et al. |
| 6,640,105 | B1 | 10/2003 | Shin |
| 6,747,958 | B2 | 6/2004 | Vayanos et al. |
| 6,760,596 | B1 | 7/2004 | Fiorini et al. |
| 6,781,970 | B1 | 8/2004 | Ovesjo et al. |
| 6,782,269 | B2 | 8/2004 | Toskala et al. |
| 6,813,284 | B2 | 11/2004 | Vayanos et al. |
| 6,816,507 | B1 | 11/2004 | Jarbot et al. |
| 6,845,088 | B2 * | 1/2005 | Terry et al. ............ 370/335 |
| 6,845,100 | B1 | 1/2005 | Rinne |
| 6,904,290 | B1 | 6/2005 | Palenius |
| 7,092,371 | B2 * | 8/2006 | Terry et al. ............ 370/335 |
| 7,313,117 | B2 * | 12/2007 | Terry et al. ............ 370/335 |
| 7,903,616 | B2 * | 3/2011 | Terry et al. ............ 370/335 |
| 2001/0021229 | A1 | 9/2001 | Belaiche |
| 2002/0021714 | A1 | 2/2002 | Seguin |
| 2002/0024944 | A1 | 2/2002 | Zhang et al. |
| 2003/0112786 | A1 | 6/2003 | Terry et al. |
| 2003/0148781 | A1 | 8/2003 | Sommer |
| 2004/0262761 | A1 | 12/2004 | Lee |
| 2005/0083897 | A1 | 4/2005 | Terry et al. |

FOREIGN PATENT DOCUMENTS

| | | |
|---|---|---|
| EP | 1 758 278 | 2/2007 |
| JP | 10-021091 | 1/1998 |
| JP | 10-269244 | 10/1998 |
| TW | 449684 | 8/2001 |
| WO | 00/28760 | 5/2000 |
| WO | 0062456 A1 | 10/2000 |
| WO | 01/24566 | 5/2001 |
| WO | 01/31938 | 5/2001 |
| WO | 01/31956 | 5/2001 |
| WO | 0161878 A1 | 8/2001 |
| WO | 01/67795 | 9/2001 |

OTHER PUBLICATIONS

3GPP TS 25.321, "Technical Specification Group Radio Access Network; MAC Protocol Specification", Release 1999, v3.9.0, Sep. 2001, pp. 1-43.

Rapporteur (STmicroelectronics Asia Pacific), "Usage of the Transport Channel Scheduling Priorities for TFC Selection," 3GPP TSG-RAN WG2 Meeting#19, R2-010526 (Feb. 19-23, 2001).

Samsung Electronics Co. Ltd, "Removal of FAUCH and ODMA," 3GPP RAN WG2 Meeting #16, R2-002022 (Oct. 2000).

Third Generation Partnership Project, "Technical Specification Group Radio Access Network; MAC protocol specification (Release 1999)," 3GPP TS 25.321 V4.13.0 (Sep. 2002).

Third Generation Partnership Project, "Technical Specification Group Radio Access Network; MAC protocol specification (Release 4)," 3GPP TS 25.321 V4.6.0 (Sep. 2002).

Third Generation Partnership Project, "Technical Specification Group Radio Access Network; MAC protocol specification (Release 5)," 3GPP TS 25.321 V5.2.0 (Sep. 2002).

Third Generation Partnership Project, "Technical Specification Group Radio Access Network; Multiplexing and channel coding (FDD) (Release 1999)," 3GPP TS 25.212 V3.11.0 (Sep. 2002).

Third Generation Partnership Project, "Technical Specification Group Radio Access Network; Multiplexing and channel coding (FDD) (Release 4)," 3GPP TS 25.212 V4.6.0 (Sep. 2002).

Third Generation Partnership Project, "Technical Specification Group Radio Access Network; Multiplexing and channel coding (FDD) (Release 1999)," 3GPP TS 25.212 V3.7.0 (Sep. 2001).

Third Generation Partnership Project, "Technical Specification Group Radio Access Network; Multiplexing and channel coding (FDD) (Release 5)," 3GPP TS 25.212 V5.2.0 (Sep. 2002).

Third Generation Partnership Project, "Technical Specification Group Radio Access Network; Multiplexing and channel coding (FDD) (Release 4)," 3GPP TS 25.212 V4.2.0 (Sep. 2001).

Third Generation Partnership Project, "Technical Specification Group Radio Access Network; Requirements for support of radio resource management (FDD) (Release 1999)," 3GPP TS 25.133 V3.11.0 (Sep. 2002).

Third Generation Partnership Project, "Technical Specification Group Radio Access Networks; Requirements for Support of Radio Resource Management (FDD) (Release 4)," 3GPP TS 25.133 V4.2.0 (Sep. 2001).

Third Generation Partnership Project, "Technical Specification Group Radio Access Network; Requirements for Support of Radio Resource Management (FDD) (Release 4)," 3GPP TS 25.133 V4.6.0 (Sep. 2002).

Third Generation Partnership Project, "Technical Specification Group Radio Access Networks; Requirements for Support of Radio Resource Management (FDD) (Release 5)," 3GPP TS 25.133 V5.0.0 (Sep. 2001).

Third Generation Partnership Project, "Technical Specification Group Radio Access Network; Requirements for Support of Radio Resource Management (FDD) (Release 5)," 3GPP TS 25.133 V5.4.0 (Sep. 2002).

Third Generation Partnership Project, "Technical Specification Group Radio Access Network; MAC protocol specification (Release 4)," 3GPP TS 25.321 V4.2.0 (Sep. 2001).

Third Generation Partnership Project, "Technical Specification Group Radio Access Network; Services provided by the physical layer (Release 1999)," 3GPP TS 25.302 V3.7.0 (Dec. 2000).

Third Generation Partnership Project, "Technical Specification Group Radio Access Network; Services provided by the physical layer (Release 1999)," 3GPP TS 25.302 V3.10.0 (Sep. 2001).

Third Generation Partnership Project, "Technical Specification Group Radio Access Network; Services provided by the physical layer (Release 1999)," 3GPP TS 25.302 V3.14.0 (Sep. 2002).

Third Generation Partnership Project, "Technical Specification Group Radio Access Network; Services provided by the physical layer (Release 4)," 3GPP TS 25.302 V4.2.0 (Sep. 2001).

Third Generation Partnership Project, "Technical Specification Group Radio Access Network; Services provided by the physical layer (Release 4)," 3GPP TS 25.302 V4.6.0 (Sep. 2002).

Third Generation Partnership Project, "Technical Specification Group Radio Access Network; Services provided by the physical layer (Release 5)," 3GPP TS 25.302 V5.2.0 (Sep. 2002).

Third Generation Partnership Project, "Technical Specification Group Radio Access Network; MAC protocol specification (Release 1999)," 3GPP TS 25.321 V3.5.0 (Sep. 2000).

Third Generation Partnership Project, "Technical Specification Group Radio Access Network; Physical layer procedures (FDD) (Release 1999)," 3GPP TS 25.214 V3.8.0 (Sep. 2001).

Third Generation Partnership Project, "Technical Specification Group Radio Access Network; Physical layer procedures (FDD) (Release 1999)," 3GPP TS 25.214 V3.11.0 (Sep. 2002).

(56) References Cited

OTHER PUBLICATIONS

Third Generation Partnership Project, "Technical Specification Group Radio Access Network; Physical layer procedures (FDD) (Release 4)," 3GPP TS 25.214 V4.2.0 (Sep. 2001).

Third Generation Partnership Project, "Technical Specification Group Radio Access Network; Physical layer procedures (FDD) (Release 4)," 3GPP TS 25.214 V4.5.0 (Sep. 2002).

Third Generation Partnership Project, "Technical Specification Group Radio Access Network; Physical layer procedures (FDD) (Release 5)," 3GPP TS 25.214 V5.2.0 (Sep. 2002).

Third Generation Partnership Project, "Technical Specification Group Radio Access Network; UE Radio Access Capabilities (Release 1999)," 3GPP TS 25.306 V3.3.0 (Sep. 2001).

Third Generation Partnership Project, "Technical Specification Group Radio Access Network; UE Radio Access capabilities (Release 1999)," 3GPP TS 25.306 V3.6.0 (Jun. 2002).

Third Generation Partnership Project, "Technical Specification Group Radio Access Network; UE Radio Access Capabilities (Release 4)," 3GPP TS 25.306 V4.2.0 (Sep. 2001).

Third Generation Partnership Project, "Technical Specification Group Radio Access Network; UE Radio Access capabilities (Release 4)," 3GPP TS 25.306 V4.5.0 (Jun. 2002).

Third Generation Partnership Project, "Technical Specification Group Radio Access Network; UE Radio Access capabilities (Release 5)," 3GPP TS 25.306 V5.2.0 (Sep. 2002).

* cited by examiner

SYSTEM AND METHOD FOR FAST DYNAMIC LINK ADAPTATION

CROSS REFERENCE TO RELATED APPLICATIONS

This application is a continuation of U.S. patent application Ser. No. 13/035,125, filed Feb. 25, 2011, which is a continuation of U.S. patent application Ser. No. 11/959,578, filed Dec. 19, 2007, which issued as U.S. Pat. No. 7,903,616 on Mar. 8, 2011, which is a continuation of U.S. patent application Ser. No. 11/503,822, filed Aug. 14, 2006, which issued as U.S. Pat. No. 7,313,117 on Dec. 25, 2007, which is a continuation of U.S. patent application Ser. No. 11/007,955, filed Dec. 9, 2004, which issued as U.S. Pat. No. 7,092,371 on Aug. 15, 2006, which is a continuation of U.S. patent application Ser. No. 10/273,302 filed Oct. 17, 2002, which issued as U.S. Pat. No. 6,845,088 on Jan. 18, 2005, which claims the benefit of U.S. Provisional Application No. 60/344,693 filed on Oct. 19, 2001, all of which are incorporated by reference as if fully set forth.

FIELD OF INVENTION

The present invention is related to the field of wireless communications. More particularly, the invention is directed to a system and method for fast dynamic link adaption in third generation wireless communication systems.

BACKGROUND

In Third Generation (3G) communication systems, Dynamic Link Adaptation (DLA) is used to compensate for degraded radio propagation conditions that would require the User Equipment (UE) to transmit at a transmission power greater then the maximum allowed, or physical maximum, transmission power. Transmissions that require to be transmitted at a power level greater than the maximum power level are transmitted at the maximum power level in 3G communication systems. When these signals are transmitted at the maximum power level (which is less than their desired transmit power level) they experience degraded performance and have increased error rates, increasing the likelihood that the transmitted data will not be received, and that the system resources being used are being wasted.

One prior art method for handling this maximum power condition is to continue the transmission at the maximum allowed or physical maximum transmission power and rely on the error correction capabilities of the receiver to correct any errors that may occur. This ultimately results in undesirable system performance, since the transmission will be made at a power level that is not adequate to maintain the desired level of error rate performance.

Another method for dealing with the maximum power condition is to reduce the Uplink (UL) data requirement for the period that the required transmission power to maintain the desired level of error rate performance is greater than the maximum power capability. This method maintains the desired error rate performance by the reduction of the data rate.

It is also possible to continue UL transmissions when the desired power would exceed the maximum power capability without effecting the UL data requirement by allowing the Block Error Rate (BLER) to increase. This effect is considered to be unavoidable for the period from when the maximum power condition is perceived to when the UL transmissions can be reconfigured to a reduced overall rate. In 3G wireless standards, UE performance requirements are specified that limit this period.

There is strong motivation to exceed the specified requirements since transmissions that require a power level greater than the maximum transmit power level are likely to fail. Services that allow for data retransmission of failed transmissions result in increased overhead, reduced radio resource efficiency and reduced UE battery life. Services that do not allow for retransmission result in an increase in the BLER, thereby causing subsequent increased power requests to attempt to maintain the BLER quality target. Since the UE is already transmitting at its maximum power, an increase in signal to interference ratio SIR target used in the UL transmit power control algorithm does not improve the BLER performance for the current channel conditions. If the channel conditions improve, the increased SIR target will require the UE to transmit at a power level greater than necessary to maintain the desired performance, resulting in reduced radio resource efficiency and battery life.

To achieve or exceed the performance requirements for improved Quality of Service (QoS), an efficient method of adjusting the UL transmission requirements is necessary.

In 3G communication systems, individual data streams are assigned to Transport Channels (TrCHs) with specific QoS capabilities, which are configured to achieve specified BLER quality targets. The physical channel(s) assigned to the UE support multiple TrCHs simultaneously; this is called a Coded Composite Transport Channel (CCTrCH). The CCTrCH allows for varying amounts of data on each TrCH to exist in any specific Transmission Time Interval (TTI). The TTI period is specific to each TrCH. Within each TTI period for a specific TrCH, the amount of data transmitted is specified by a Transport Format (TF).

For the CCTrCH in any specific TTI period, the set of TFs for each TrCH is known as the Transport Format Combination (TFC). The set of all of the available TFCs, (i.e. all of the available allowed multiplexing options), is known as the Transport Format Combination Set (TFCS).

For each UL CCTrCH, the UE Medium Access Control (MAC) entity selects a TFC for transmission on a TTI basis. This TFC and associated data is provided to the physical layer for transmission in the physical data request primitive. If the physical layer subsequently determines transmission of this TFC exceeds the maximum or allowable UE transmission power, a physical status indication primitive is generated to the MAC to indicate that maximum power or allowable transmission power has been reached.

When the MAC is informed of the maximum or allowable transmission power has been reached, the TFCs that would cause this condition to continue to exist are blocked, that is, removed from the set of available TFCs, unless the TFC is one of the TFCs which according to the 3GPP standards cannot be blocked. Blocked TFCs may be later restored to the set of available TFCs by unblocking them in subsequent periods when the UE transmission power measurements indicate the ability to support these TFCs with less than or equal to the maximum or allowed UE transmission power.

There are, however serious drawbacks with the current manner in which TFCs are removed. As aforementioned, the physical layer determines whether the transmission of a TFC would require exceeding the maximum or allowable UE transmission power, and then a physical status indication primitive is generated to the MAC entity that indicates maximum power or allowable power has been reached. Using this method, the UE could be in the maximum power state for approximately 60 milliseconds or more while the MAC reconfigures the set of available TFCs to remove the blocked TFCs and start selecting TFCs from the updated set of available TFCs. The UE will reduce the available TFCs only to the power requirement for the TFC that exceeded the transmission power capability. The UE will then likely choose the TFC with the next lower transmission power requirement. However, there is no guarantee that the reduced set of TFCs will not require power in excess of the maximum power. This results in another iteration of the process, and an additional delay, to further reduce the set of TFCs. For each TFC that is eliminated, data and radio resources are lost for the given TTIs. Ultimately, the performance of the system is degraded during the maximum power condition.

Additional performance concerns arise when the UE is attempting to recover the TFCs that have been blocked due to the maximum power condition. It is desirable to unblock, (i.e., recover), TFCs as quickly as possible to have a more complete set of TFCs available for the UE to use. Ultimately, the performance of the system is improved when the TFCs are recovered efficiently.

Accordingly, the prior art methods of handling the situation where the UE is in its maximum power state fall far short of acceptable system performance. It would be desirable to have an improved method of expeditiously reducing the set of TFCs for the duration when maximum UE power condition is achieved, and expeditiously restoring the TFCs when the maximum UE power condition has passed.

SUMMARY

The present invention is system and method for enabling efficient reduction of TFCs in the TFCS to support a desired transmission, while remaining within power and data requirements. In the event that the UE transmission power requirements exceed the maximum or allowable transmission power, the set of TFCs is reduced to only those acceptable TFCs that currently do not exceed the power limit. The UE will then chose from among the acceptable reduced set of TFCs.

The invention also supports advanced determination of non-supported TFCs. The TFCs that require transmission power greater then the maximum or allowed UE transmission power shall be determined continuously in every TTI, not just in TTIs where the maximum power has been exceeded. The TFC selection process is adjusted to avoid selection of TFCs that exceed transmission power capabilities in advance of transmission.

The present invention also enables the restoration of the TFCs in the TFCS when the maximum power condition no longer exists.

DETAILED DESCRIPTION OF THE PREFERRED EMBODIMENT(S)

Figure 1:
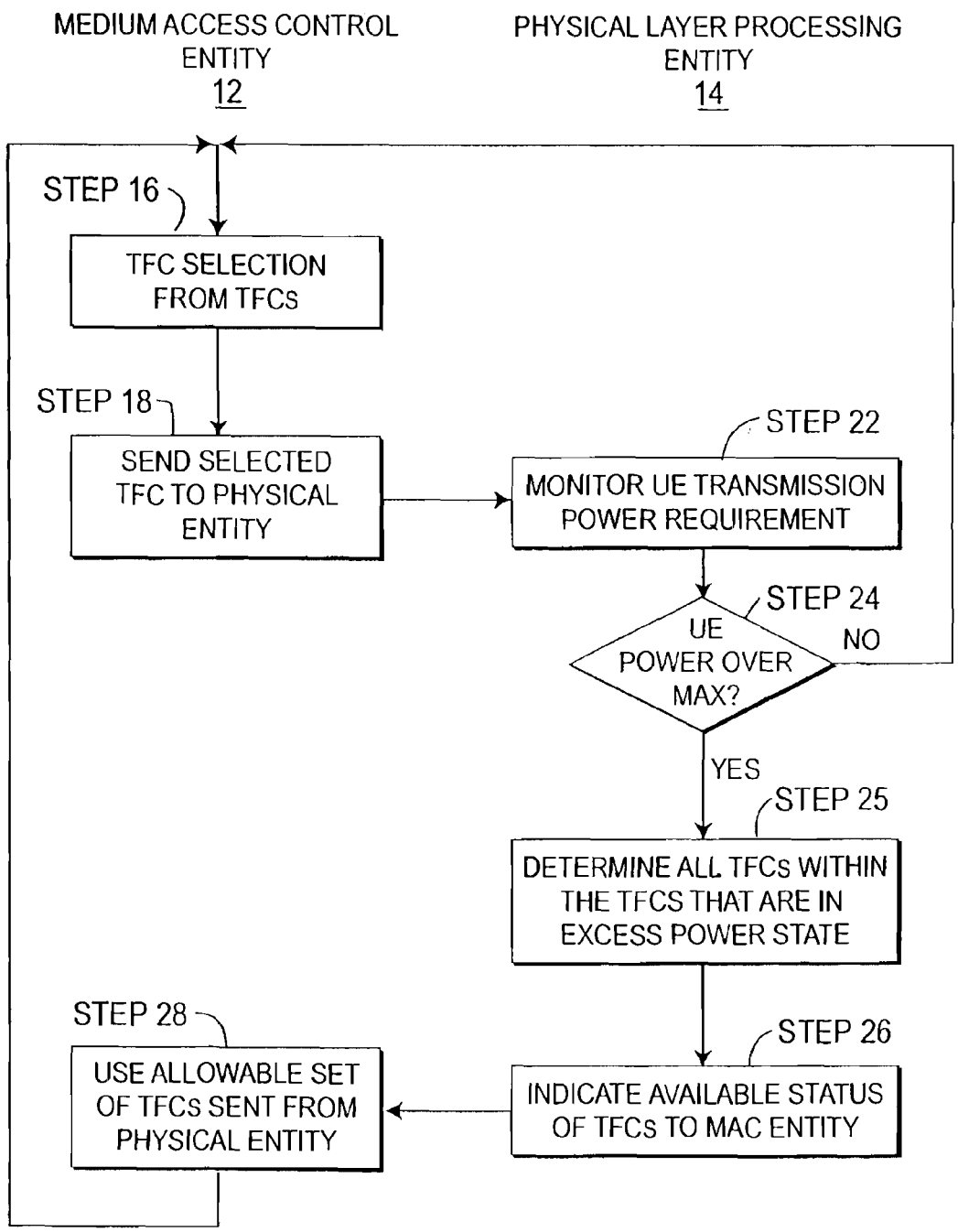
FIG. 1 is a flow diagram for efficient removal of TFCs in accordance with the present invention.

The present invention will be described with reference to the drawing figures wherein like numerals represent like elements throughout.

There are three basic aspects to dynamic link adaption in accordance with the present invention. First, when a condition exists where the UE transmission power requirement exceeds the maximum, or maximum allowed, power of the UE, the TFCs that require power in excess of the maximum power limit are efficiently blocked. The MAC is informed, for subsequent TFC selection, of all TFCs that currently exceed this limit. Thereafter, only TFCs that do not require power in excess of the UE transmission power limit capability are available for selection.

Secondly, the present invention supports efficient recovery of TFCs in the TFCS when the maximum power condition no longer exists.

Finally, the invention supports advance determination of non-supported TFCs; i.e. those TFCs that require transmission power greater then the maximum or allowed UE transmission. These TFCs are determined continuously and periodically, such as in every TTI, not just in TTIs where the maximum power condition exists. Every TTI may or may not include TTIs where no data is transmitted. Since TFC requirements change over time, this allows for advance determination of TFCs that will not be supported.

It should be noted that although the present invention relates to removal and restoration of TFCs, a minimum set of TFCs within the configured TFCS should always be available for transmission. Preferably, this minimum set is exempt from the TFC removal and restoration processes that will be described hereinafter.

The processes for TFC removal and restoration are performed periodically. Although the period for these processes is described hereinafter as being based on a TTI, it is also possible to perform actions approximately every TTI, (i.e., more then once per TTI), or every several TTIs. It should also be noted that every TTI may or may not include TTIs where no data is transmitted.

Referring to FIG. 1, the procedure 10 for efficient removal of TFCs in accordance with the present invention is shown. The procedure 10 commences with selection of TFCs using the available set of TFCs (step 16). The available set of TFCs is the initial full transport format combination set (TFCS) configured for the establishment of the CCTrCH. The selected TFC is sent to the physical entity 14 (step 18). The physical entity 14 determines the TFC transmission power requirement (step 22) and makes a determination of whether the required UE transmit power for this TFC is over the maximum, or maximum allowable, UE power (step 24). If not, steps 16, 18, 22 and 24 are repeated until the transmission power requirement for a TFC exceeds the maximum allowed power. If for transmission of a TFC the UE power requirement is over the maximum allowed power, the physical entity 14 determines all TFCs within the TFCS that are in "excess power state" (step 25). The physical entity 14 indicates the available or not-available (i.e. blocked) status of the TFCs to the MAC entity 12 (step 26). It should be noted that the physical entity 14 can indicate the status of the available TFCs, the not-available TFCs or both. The MAC entity 12 removes TFCs in the excess power state as indicated by the physical layer entity 14 from the available set of TFCs (step 28). The procedure 10 is then repeated for each TTI.

Although functionality is specifically identified as being performed in the physical layer, it is also possible to perform some of these actions in the MAC layer.

Figure 2:
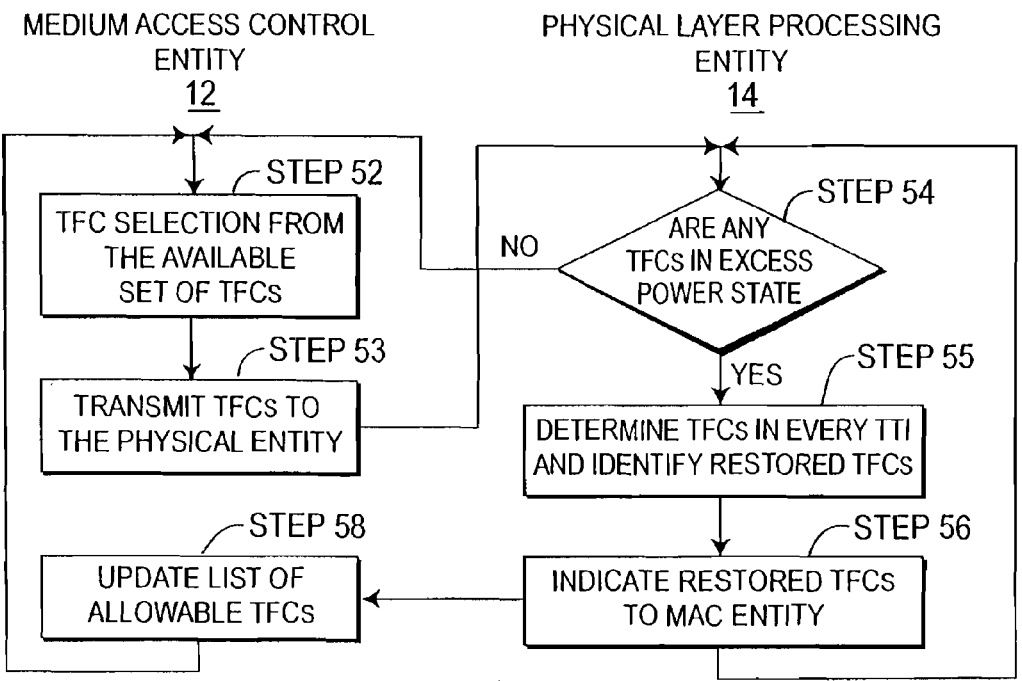
FIG. 2 is a flow diagram for restoration of TFCs in the TFCS.

Referring to FIG. 2, the procedure 50 for restoration of TFCs in the excess power state is shown. The MAC entity 12 selects a TFC using the available set of TFCs (step 52). The available set of TFCs is either the initial full Transport Format Combination Set (TFCS) configured upon the establishment of the CCTrCH, or a reduced available set of TFCs from the TFCS, which were previously indicated from the physical entity 14. The selected TFC is sent to the physical entity 14 (step 53).

The physical entity 14 determines whether any TFCs are in the excess power state (step 54). The determination is performed on a periodic basis only for those TFCs within the configured TFCS that are in the excess power state. This periodic basis may be, for example, every TTI. The physical entity 14 then determines whether any of the TFCs that were in the excess power state no longer exceed the maximum or maximum allowed power, and can be restored to the set of available TFCs (step 55). The physical entity 14 then indicates restored TFCs to the MAC entity 12 (step 56). If there is a change in available TFCs, (i.e. if the TFCs are unblocked), the MAC entity 12 updates its list of available TFCs (step 58). Steps 52-58 are continuously repeated by the MAC and physical layer entities 12, 14. This procedure 50 ensures that when TFCs are blocked, recovery of available TFCs are continuously determined every TTI, not just in TTIs where the maximum power has been exceeded.

The restoration of TFCs is much more efficient when unblocked TFCs are indicated on a periodic basis, rather than being determined by the UE calculated transmitted power measurements on the transmitted signal, since the normal measurement reporting and processing mechanism is slow. This enables the UE to avoid reducing the transmitting rate to less than the data rate that is supported by the current channel conditions. The UE can restore the desired TFCs based on the predicted transmitted power requirement prior to transmission, reducing the time required to restore the TFCs by one or more TTIs.

Figure 3:
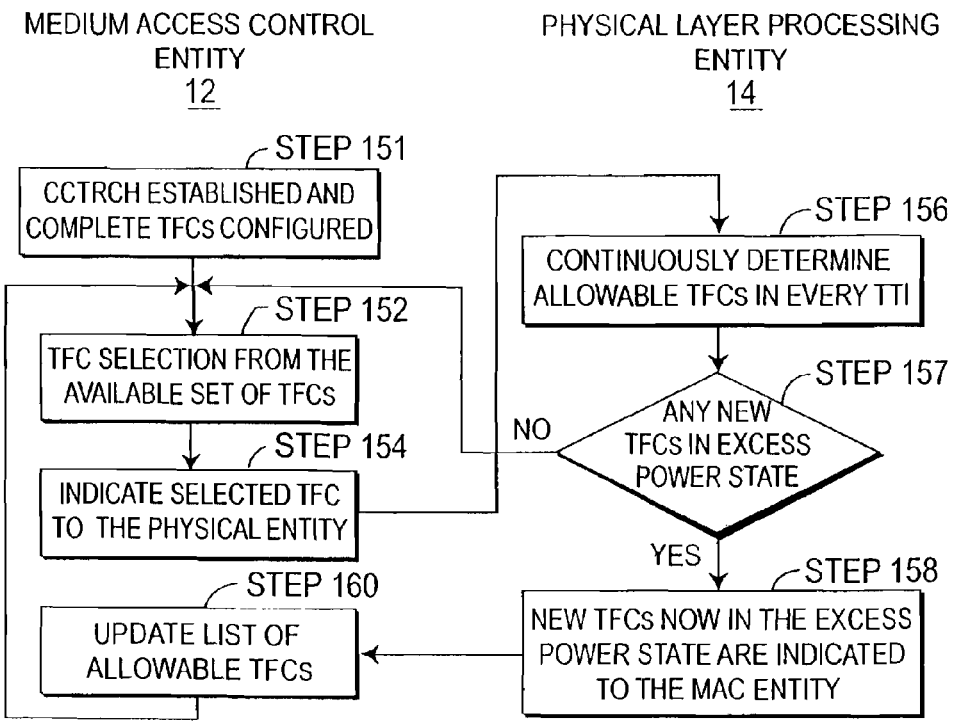
FIG. 3 is a flow diagram for advance removal of TFCs in accordance with the present invention.

Referring to FIG. 3, the procedure 150 advance removal of TFCs in accordance with the present invention is shown. The procedure 150 commences CCTrCH establishment and the configuration of the complete TFCS (step 151). A TFC is then selected from the available set of TFCs (step 152). The MAC entity 12 sends the selected TFC to the physical entity 14 (step 154). The physical entity 14 continuously determines the available TFCs on a periodic basis (step 156), such as in every TTI as shown in FIG. 3. The ability to transmit all available TFCs is verified. A determination is made (step 157) as to whether any previously unblocked TFCs are now in the excess power state. If not, the procedure 150 returns to step 152, to repeat the procedure 150. If so, the new TFCs now in the excess power state are indicated to the MAC entity 12 (step 158). The MAC entity 12 updates the list of all available TFCs (step 160). It should be noted that steps 152, 154 and 160 performed by the MAC entity 12 and steps 156, 157, 158 performed by the physical entity 14 are continuously repeated, not necessarily in each TTI as represented in FIG. 3.

Since TFC transmission power requirements, which change over time, are checked for restoration on a periodic basis, such as in each TTI, this method 150 allows for advance determination of TFCs that will not be supported. TFC power requirements are checked each TTI in step 156 to determine if the maximum or maximum allowed power is exceeded. If the power requirement cannot be satisfied for a TFC currently not blocked, the physical entity 14 indicates to the MAC entity 12 that this TFC should be blocked (step 158). The TFC selection process is adjusted to avoid selection of TFCs that exceed transmission power capabilities in advance of transmission of that TFC. Additionally, if the power requirement can be satisfied for a currently blocked TFC, the list of allowable TFCs is continuously updated so that previously blocked TFCs may be restored.

Advance determination may additionally employ logic that determines change in radio propagation conditions over time. For example, the change in pathloss from a received reference channel, or the change in reported uplink interference. These and other changes in radio propagation conditions allow the UE to predict future transmission power requirements and block TFCs in advance of interference, pathloss or other conditions that would cause TFCs to enter an excess power state.

The result of the advance determination method 150 is the reduced loss of UL data and more efficient use of radio resources by the proper TFC selection for successful transmission. By blocking TFCs before TFC selection and transmission, user QoS is improved by reduced BLER, and physical resources are better utilized by reducing the need for retransmissions. Since TrCH BLER is reduced, corresponding unnecessary increases in the UL SIR target is avoided, further increasing overall radio resource efficiency by reducing UL transmit power.

Although the methods 10, 50 and 150 to continuously update the available TFCs provide for improved performance, the computational resources required to calculate the power requirements for every TFC every TTI is great. Accordingly, referring to FIGS. 4 and 5, two alternatives to determining TFC transmit power requirements on a periodic, or TTI basis, are shown.

Figure 4:
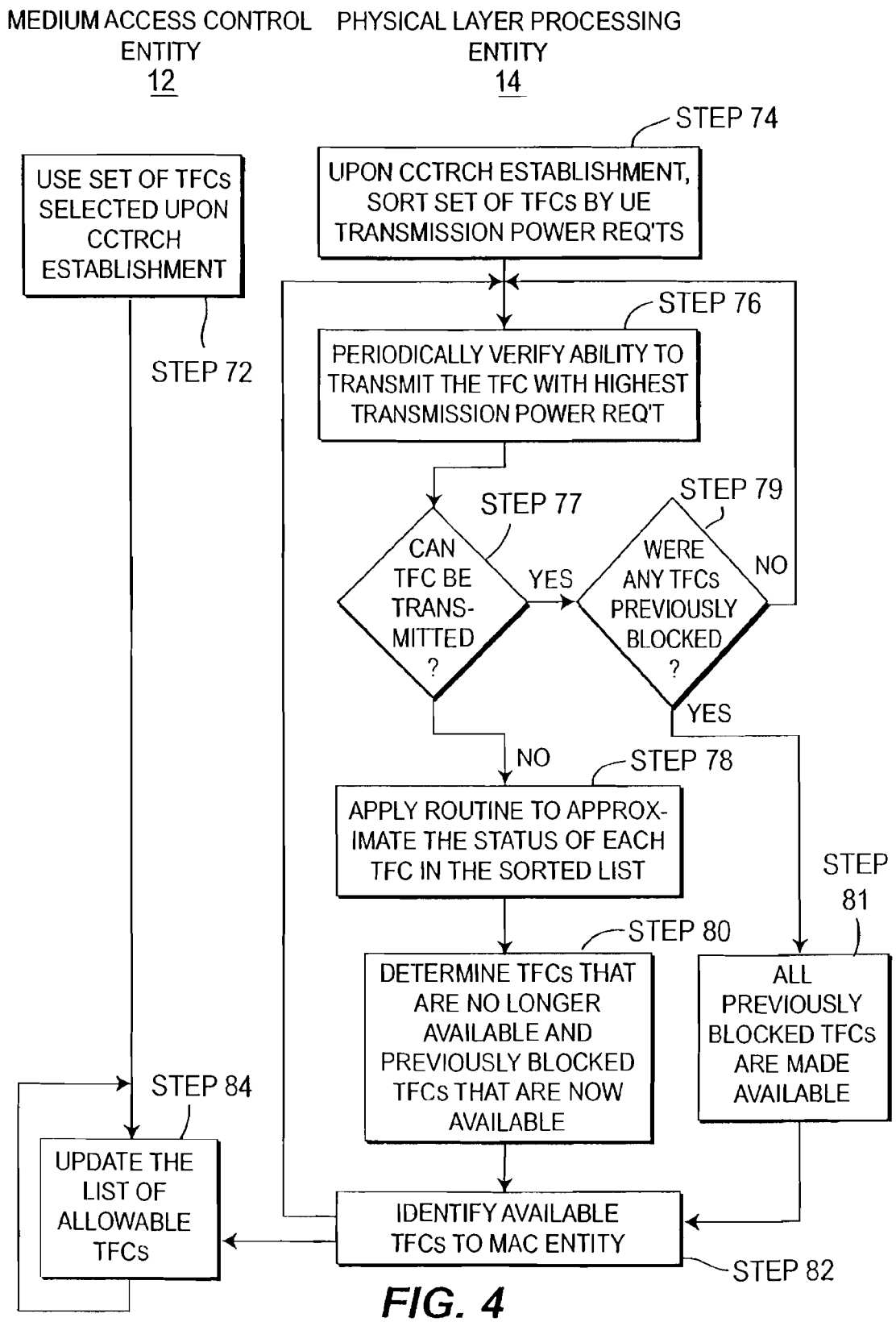
FIGS. 4 and 5 are flow diagrams for two alternatives to determining TFC transmit power requirements on a periodic basis.

The method 70 of FIG. 4 commences with the MAC entity 12 using the set of TFCs which were determined upon CCTrCH establishment or reconfiguration (step 72). Upon CCTrCH establishment or reconfiguration the configured TFCS is sorted by TFC according to transmission power requirements (step 74). Note that although indicated in the physical layer 14, the sorted TFC list may be determined in either layer 2 or layer 3 entities as well. In TDD systems, this list of TFCs may be timeslot specific, such as a sorted TFC list per timeslot. The physical entity 14 periodically verifies the ability to transmit the TFC with the highest transmission power requirement (step 76). A determination is made as to whether the TFC can be transmitted (step 77). If this TFC can be transmitted, a determination is made (step 79) as to whether there were any blocked TFCs. If so, all the previously blocked TFCs are made available (step 81) and the physical layer entity 14 goes to step 82 and indicates to the MAC entity 12 that all TFCs within the TFCS should be unblocked and are now available. If not, the procedure 70 returns to step 76.

However, if it is determined (step 77) that the TFC with the highest transmission power requirement cannot be transmitted or if the TFC with highest transmit power requires a transmission power greater than the maximum allowed power, a procedure is implemented to approximate the status of each TFC in the sorted list (step 78). The specific process to efficiently determine which TFCs should be blocked is not central to the present invention, since there are numerous alternative options that could be utilized. In a first alternative of the present invention, for example, since there is a sorted TFC list, the middle TFC within the list is checked to see whether it can be transmitted. If it cannot be transmitted, the TFC in the middle of the lower half of the list is checked to see if it can be transmitted. Likewise, if the TFC in the middle of the list can be transmitted, the TFC in the middle of the upper half of the list is checked to see whether it can be transmitted. This process is repeated until the TFC with the highest power requirements that can be transmitted. Another alternative is to apply a hashing function to approximate the list index that exceeds the power capability.

The physical entity 14 determines the TFCs that are not supported and previously blocked TFCs that are now supported (step 80), and indicates the updated available and blocked TFCs to the MAC entity (step 82).

An alternative to sending an updated complete list of unblocked TFCs, or a list of newly unblocked TFCs, from the physical entity 14 to the MAC entity 12 is to transmit only an "index" to the sorted TFC list. For example, when the TFC list is sorted, entries above the index are blocked and entries below are unblocked. Transmission of the index will reduce the amount of control signaling required between the physical entity 14 and the MAC entity 12.

A second alternative to sending an updated complete list of unblocked TFCs, or a list of newly unblocked TFCs, from the physical entity 14 to the MAC entity 12 is to send a measured or calculated value from the physical entity 14 to the MAC entity 12 (or any other layer 2 entity) which would allow the layer 2 entity to determine the new set of available TFCs. It should be noted that many of the steps shown in FIG. 4 as being performed by the physical entity 14 could also be performed by the MAC entity 12 such as steps 78 and 80.

Steps 76-82 are then repeated. Once the physical entity 14 transmits the updated list, (or TFCS index or measured/calculated value) of allowable TFCs to the MAC entity 12, the MAC entity 12 updates the list of available TFCs (step 84).

Figure 5:
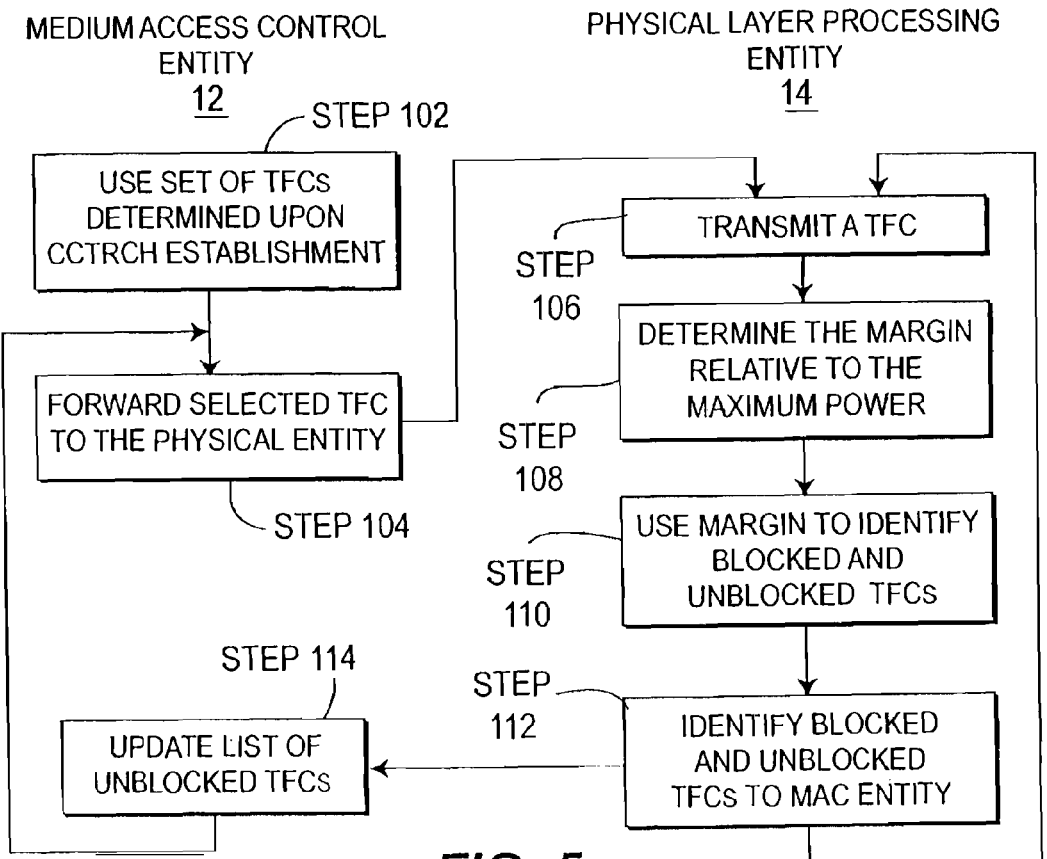

Referring to FIG. 5, a second alternative method 100 to periodically determining TFC transmit power requirements is shown. The MAC entity 12 initially uses the set of TFCs configured upon CCTrCH establishment or reconfiguration (step 102). Upon CCTrCH establishment or reconfiguration, each TFC is associated with a relative sensitivity. This can be done by the MAC entity 12, the physical entity 14 or any layer 2 or layer 3 entities. This sensitivity can be an En/No requirement under a certain propagation channel assumption, a maximum tolerable path loss under a propagation channel/transmit power assumption or other method mapped onto integers 0-N. Additionally in TDD systems, this relative sensitivity may be timeslot specific.

The MAC entity 12 forwards the selected TFC to the physical entity 14 (step 104). The physical entity 14 transmits a TFC (step 106) and determines the margin relative to the maximum power (step 108). The physical entity 14 uses the margin to identify blocked and unblocked TFCs (step 110). It should be noted that this margin may be negative, which indicates a potential blocking, or positive, which indicates a potential recovery. These blocked and unblocked TFCs are then identified to the MAC entity (step 112). The physical entity 14 then repeats steps 106-112 upon each TFC transmission. Having received the blocked and unblocked TFC indications from the physical entity 14, the MAC entity 12 updates the list of blocked and unblocked TFCs (step 114). Steps 104 and 114 are then repeated by the MAC entity 12.

Figure 6:
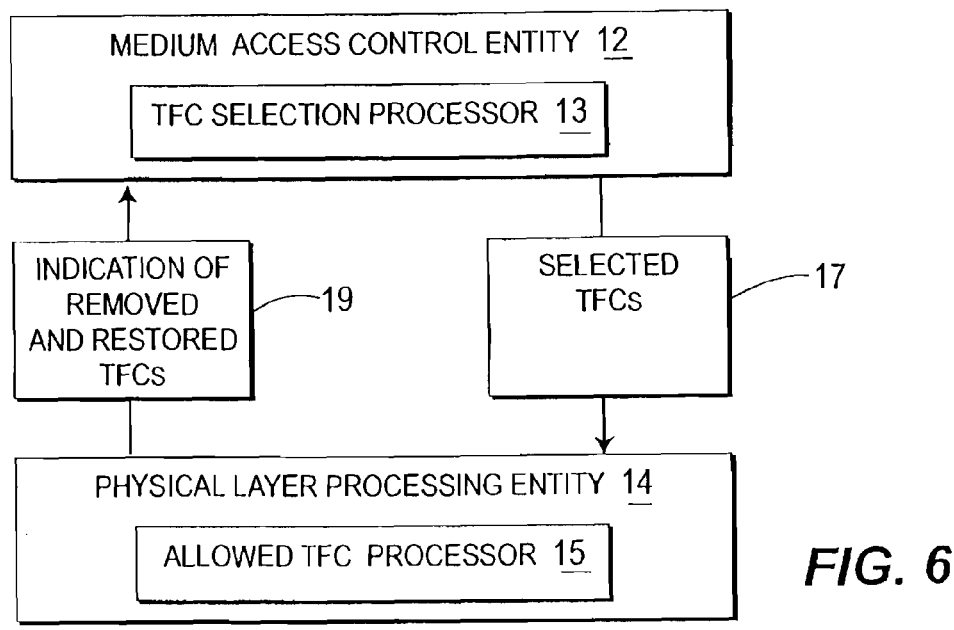
FIG. 6 is a block diagram of the MAC entity and the physical entity.

Referring to FIG. 6, a block diagram of the MAC entity 12 and the physical entity 14 is shown. The MAC entity 12 includes a TFC selection processor 13, which selects the TFCs for transmission associated with a particular CCTrCH supporting the desired TrCHs. Likewise, the physical entity 14 has an allowed TFC processor 15 which determines blocked and unblocked TFCs and indicates the blocked and unblocked TFCs to the TFC selection processor 13. Although physical layer processing is preferable, it is also possible to perform some of the aforementioned processing within the MAC layer or other layer 2 entities. In accordance with the embodiments shown in FIGS. 4 and 5, the TFC processor 15 also performs the sorting of the TFCs by UE transmission power requirements. The sorted list or the determination of the relative sensitivity can also be determined in the TFC selection processor 13. Accordingly, this processing may be performed in the physical layer, the MAC or other layer 2 entities, or even a layer 3 entity. The MAC entity 12 forwards the selected TFCs 17 (chosen from the available TFCs in the configured TFCS) to the physical entity 14. In response, the physical entity 14 indicates blocking and unblocking (removal and restoration) of TFCs 19.

It should be noted that although the methods 10, 50, 150 have been described hereinbefore as separate procedures, it should clearly be understood by those of skill in the art that the methods may be combined as desired for particular applications and processing may be performed at the same time. When combining logic in methods 10, 50 and 150, some changes in the logic specified for each method are necessary for integration of the methods to achieve proper operation. As such, while the present invention has been described in terms of the preferred embodiments, other variations, which are within the scope of the invention, as outlined in the claims below will be apparent to those skilled in the art

What is claimed is:

1. A method for selecting a transport format combination (TFC), implemented by a user equipment, the method comprising:
   receiving configuration of a plurality of TFCs to use for TFC selection, wherein the TFCs of the plurality of TFCs have an order;
   determining TFCs to block from TFC selection from the plurality of TFCs, wherein the TFCs to block are based at least on a maximum allowed transmit power; and
   selecting a TFC for transmission of uplink data, wherein the selecting the TFC is based on the TFC order and wherein the selected TFC is a TFC that is not blocked from TFC selection.

2. The method of claim 1, wherein the determining TFCs to block from TFC selection takes places at least once every transmission time interval.

3. The method of claim 1, wherein the configuration of the plurality of TFCs is an initial configuration.

4. The method of claim 1, wherein the configuration of the plurality of TFCs is a reconfiguration.

5. The method of claim 1, wherein the TFC order is based on a transmission power requirement.

6. The method of claim 1, wherein the selected TFC is derived from a margin.

7. The method of claim 6, wherein the margin is derived from the maximum allowed transmit power.

8. A user equipment comprising:
   circuitry configured to receive configuration of a plurality of transport format combinations (TFCs) to use for transport format combination (TFC) selection, wherein the TFCs of the plurality of TFCs have an order;
   circuitry configured to determine TFCs to block from TFC selection from the plurality of TFCs, wherein the TFCs to block are based at least on a maximum allowed transmit power; and
   circuitry configured to select a TFC for transmission of uplink data, wherein the selected TFC is based on the TFC order and wherein the selected TFC is a TFC that is not blocked from TFC selection.

9. The user equipment of claim 8, wherein the circuitry configured to determine TFCs to block from TFC selection is configured to take places at least once every transmission time interval.

10. The user equipment of claim 8, wherein the configuration of a plurality of TFCs is an initial configuration.

11. The user equipment of claim 8, wherein the configuration of a plurality of TFCs is a reconfiguration.

12. The user equipment of claim 8, wherein the TFC order is based on a transmission power requirement.

13. The user equipment of claim 8, wherein the selected TFC is derived from a margin.

14. The user equipment of claim 13, wherein the margin is derived from the maximum allowed transmit power.

* * * * *